United States Patent
Hsu

(10) Patent No.: US 9,261,900 B2
(45) Date of Patent: Feb. 16, 2016

(54) SHIFT-BRAKE DEVICE OF TWIN-SHAFT HINGE

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 11 days.

(21) Appl. No.: 14/224,146

(22) Filed: Mar. 25, 2014

(65) Prior Publication Data

US 2015/0184439 A1 Jul. 2, 2015

(30) Foreign Application Priority Data

Dec. 31, 2013 (TW) .............................. 102224989 U

(51) Int. Cl.
*G06F 1/16* (2006.01)

(52) U.S. Cl.
CPC ................ *G06F 1/16* (2013.01); *G06F 1/1681* (2013.01); *Y10T 16/547* (2015.01); *Y10T 16/5408* (2015.01)

(58) Field of Classification Search
CPC ............... Y10T 16/5387; Y10T 16/540255; Y10T 16/547; Y10T 16/53864; Y10T 16/53824; Y10T 16/551; Y10T 16/5385; Y10T 16/5403; Y10T 16/5408; Y10T 16/5478; E05D 3/06; E05D 3/12; E05D 11/06; E05D 11/087; E05D 11/078; E05D 11/1078; E05Y 2900/606; G06F 1/1616; G06F 1/1681; G06F 1/16; H04M 1/022
USPC ........... 16/303, 330, 366, 302, 282, 374, 297, 16/337, 350, 371; 455/575.3; 379/433.13; 361/679.27
See application file for complete search history.

(56) References Cited

U.S. PATENT DOCUMENTS

| | | | | |
|---|---|---|---|---|
| 8,627,546 | B2 * | 1/2014 | Zhang et al. ..................... | 16/368 |
| 8,776,319 | B1 * | 7/2014 | Chang et al. ..................... | 16/366 |
| 8,904,601 | B2 * | 12/2014 | Hsu ................................. | 16/366 |
| 8,959,719 | B2 * | 2/2015 | Hsu ................................. | 16/366 |
| 8,959,720 | B2 * | 2/2015 | Hsu ................................. | 16/366 |
| 8,978,206 | B2 * | 3/2015 | Hsu et al. ........................ | 16/302 |
| 9,003,606 | B2 * | 4/2015 | Hsu ................................. | 16/366 |
| 9,009,919 | B1 * | 4/2015 | Chiang ........................... | 16/366 |
| 2011/0265288 | A1 * | 11/2011 | Chiang ........................... | 16/341 |
| 2012/0192381 | A1 * | 8/2012 | Zhang et al. ..................... | 16/366 |
| 2013/0135809 | A1 * | 5/2013 | Uchiyama et al. ........ | 361/679.09 |
| 2014/0223693 | A1 * | 8/2014 | Hsu ................................. | 16/282 |
| 2014/0223694 | A1 * | 8/2014 | Hsu ................................. | 16/302 |
| 2014/0368996 | A1 * | 12/2014 | Tsao et al. ............... | 361/679.55 |
| 2015/0020351 | A1 * | 1/2015 | Lin ................................. | 16/366 |

* cited by examiner

*Primary Examiner* — William Miller
(74) *Attorney, Agent, or Firm* — Rosenberg, Klein & Lee

(57) ABSTRACT

A shift-brake device includes a locking assembly and two pivot shafts. The locking assembly includes a base seat, a pressing plate and two shaft sleeves. The pressing plate pivotally connected to the base seat is configured with two sleeve holes, and convex portions, the two shaft sleeves are respectively configured with sleeve portions. The two shaft sleeves are configured with circular flanges having concave portions. The pivot shafts arranged on the base seat and the pressing plate are linked with the shaft sleeves. When one pivot shaft is pivoted, the connected shaft sleeve is synchronically driven to cause a concave portion thereof to be deviated from a corresponding convex portion of the pressing plate, the circular flange of the shaft sleeve pushes against the convex portion of the pressing plate to incline the pressing plate, thus to cause the other shaft sleeve unable to be pivoted.

29 Claims, 7 Drawing Sheets

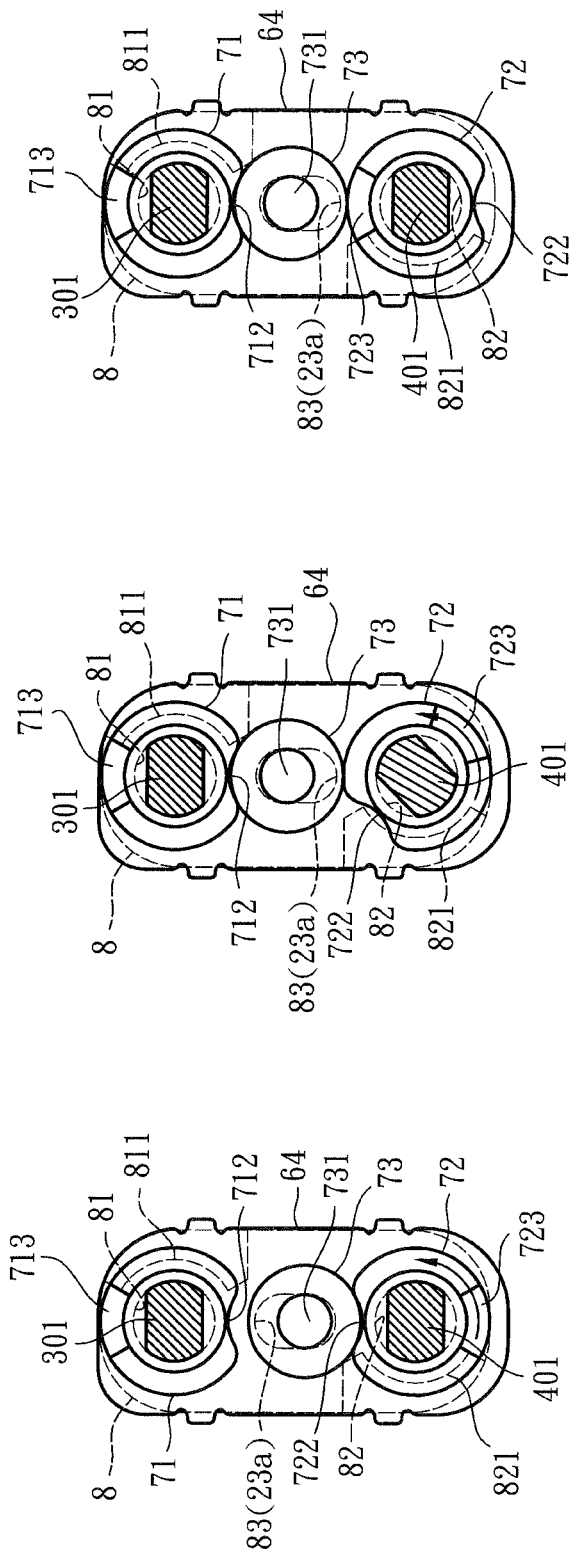

SHIFT-BRAKE DEVICE OF TWIN-SHAFT HINGE

BACKGROUND OF THE INVENTION

1. Field of the Invention

The present invention relates to a shift-brake device of a twin-shaft hinge, and in particular relates to a shift-brake device with small volume, simple operation and ideal lock-in effect in sequence rotation.

2. Description of the Related Art

Referring to FIGS. 1 and 2, a conventional double rotary shaft hinge device mainly includes a first pivot shaft 30, a second pivot shaft 40, a packing assembly 6, a pivotal positioning assembly 7 and a pivotal limit sheet 8. The first and second pivot shafts 30 and 40 include positioning planes 301 and 401, connecting portions 302 and 402, and fixing portions 303 and 403. In the first and second pivot shafts 30 and 40, the positioning planes 301 and 401 are respectively configured on regions extending from middle sections toward first end portions, the fixing portions 303 and 403 (e.g., external screw threads) are respectively configured on first end portions thereof, and the connecting portions 302 and 402 are respectively configured on second end portions thereof to couple with a pivotal member (e.g., a liquid crystal monitor) and a relative pivotal member (e.g., a host body).

The packing assembly 6 includes elastic portions 61 and 62, a positioning portion 63 (e.g., a threaded hole) and a base body 65. In the packing assembly 6, the base body 65 can be implemented by cooperating with a separate spacer positioning sheet 2a, and the base body 65 and the spacer positioning sheet 2a are respectively correspondingly configured with through holes 651/652 and 21a/22a which are provided for being penetrated through by the first and second pivot shafts 30 and 40. The spacer positioning sheet 2a is configured with an elongated slot 23a located between the two through holes 21a and 22a. One side of the base body 65, which is apart from the spacer positioning sheet 2a relative to the through holes 651 and 652, is respectively connected with the elastic portions 61 and 62. The elastic portions 61 and 62 of the packing assembly 6 are sleeved on one end portions of the first and second pivot shafts 30 and 40 which are provided with the positioning planes 301 and 401. Two fixing members 304 and 404 (e.g., screw nuts) are utilized to respectively engage with the fixing portions 303 and 403 (the external screw threads) of the first and second pivot shafts 30 and 40, so that a packing condition with elasticity can be kept between the first and second pivot shafts 30 and 40 and the base body 65 of the packing assembly 6, i.e., the first and second pivot shafts 30 and 40 can be prevented from being released from the packing assembly 6 respectively. The positioning portion 63 (the threaded hole) configured on the base body 65 is located between the elastic portions 61 and 62.

The pivotal limit sheet 8, which is configured on one side of the base body 65 of the packing assembly 6 apart from the elastic portions 61 and 62 thereof, includes two through holes 81 and 82 which are corresponding to the through holes 651 and 652 of the base body 65, two stop portions 811 and 821 which are configured on sides of external peripheries of the through holes 81 and 82 with different limit ranges of dimensions and angles, and an elongated slot 83 located between the two through holes 81 and 82.

The pivotal positioning assembly 7, which is configured between the pivotal limit sheet 8 and the spacer positioning sheet 2a, includes two linking wheels 71 and 72 and a movable wheel 73. The linking wheels 71 and 72 respectively include coupling holes 711 and 721, positioning concave portions 712 and 722 and side convex portions 713 and 723, in which the coupling holes 711 and 721 are respectively configured on centers thereof and capable of being sleeved on the positioning planes 301 and 401 of the first and second pivot shafts 30 and 40, the positioning concave portions 712 and 722 are respectively configured on external peripheries thereof, and the side convex portions 713 and 723 are respectively configured on lateral sides thereof. The side convex portions 713 and 723 of the linking wheels 71 and 72 are respectively limited by the stop portions 811 and 821 of the pivotal limit sheet 8, thus to form different pivotal limit ranges of dimensions and angles. The movable wheel 73 includes a support shaft 731 which is configured on a center thereof and with convex extensions. With two end portions of the support shaft 731 of the movable wheel 73 to respectively enter into the elongated slot 23a of the spacer positioning sheet 2a and the elongated slot 83 of the pivotal limit sheet 8, the movable wheel 73 is allowed to slide within a limit region. An elastic sheet 74 disposed between the movable wheel 73 and the pivotal limit sheet 8 includes a central hole 741, in which the central hole 741 is configured on a center thereof and capable of being sleeved on the support shaft 731 of the movable wheel 73. With the elastic sheet 74, the movable wheel 73 can be kept in packing contact condition together with the linking wheels 71 and 72.

In one example, the above-described assembles and components of the conventional double rotary shaft hinge device can be disposed in a predetermined containing space 501 of an external sleeve tube 50. The external sleeve tube 50 includes the containing space 501 and a to-be-positioned portion 503 (e.g., a through hole), in which one side of the containing space 501 is closed, and the to-be-positioned portion 503 is corresponding to the positioning portion 63 (the threaded hole) of the packing assembly 6. A positioning element 631 (e.g., a bolt) is utilized to pass through the to-be-positioned portion 503 of the external sleeve tube 50 to screw into the positioning portion 63 of the packing assembly 6, so that the locking assembly I and the packing assembly 6 can be connectively positioned with the external sleeve tube 50.

Referring to FIGS. 3, 4, 5, 6 and 7, in practical use of the conventional double rotary shaft hinge device, when the pivotal member (the liquid crystal monitor) and the relative pivotal member (the host body) are situated in a relatively covered storage condition, the first and second pivot shafts 30 and 40 are respectively utilized to link the linking wheels 71 and 72 of the pivotal positioning assembly 7 to face the positioning concave portions 712 and 722 toward the same side (as shown in FIG. 3). As shown in the figures, one side portion of the linking wheel 71 apart from the positioning concave portion 712 is pushed against the movable wheel 73 to embed into the positioning concave portion 722 of the linking wheel 72. Meanwhile, the first pivot shaft 30 is allowed to continuously rotate due to mutually propping contact between relative convex arc surfaces of the linking wheel 71 and the movable wheel 73, and the second pivot shaft 40 is situated in a fixed unpivoted condition (as shown in FIG. 4) in the pivoting process. Then, the positioning concave portion 712 of the linking wheel 71 is rotated to face toward the movable wheel 73 (as shown in FIG. 5) to release the propping contact to the movable wheel 73 until the first pivot shaft 30 drives the linking wheel 71 to pivot with a predetermined angle (about 180 degrees in the figures). At this time, the movable wheel 73 is allowed to slide in an extension direction of the elongated slot 23a of the spacer positioning sheet 2a and the elongated slot 83 of the pivotal limit sheet 8, and the second pivot shaft 40 (the linking wheel 72 of the pivotal positioning assembly 7) is situated in a pivotable condition.

Then, as shown in FIG. 6, the second pivot shaft 40 is allowed to drive the linking wheel 72 to pivot in a direction opposite to the pivotal direction of the first pivot shaft 30 (the linking wheel 71). Meanwhile, in the pivotal process of the second pivot shaft 40, the periphery of the linking wheel 72 is propped against the movable wheel 73 to cause the movable wheel 73 to embed into the positioning concave portion 712 of the linking wheel 71, enabling the first pivot shaft 30 to turn into an unpivoted lock condition. Then, as shown in FIG. 7, the positioning concave portion 722 of the linking wheel 72 is pivoted to face toward the movable wheel 73 to release the propping contact to the movable wheel 73 until the second pivot shaft 40 drives the linking wheel 72 to pivot with a predetermined angle (about 180 degrees in the figures). Accordingly, it is convenient that, after each use, one of the first and second pivot shafts 30 and 40 can be reversely pivoted in advance to recover to the initial folding condition thereof.

In practice, however, the conventional double rotary shaft hinge device has following difficulties required to be solved. Firstly, because the movable wheel 73 is configured between the linking wheels 71 and 72, sequence rotational control of the first and second pivot shafts 30 and 40 may be functionally failed if the entire volume is reduced. Moreover, because the distance between the first and second pivot shafts 30 and 40 is not easy to be shortened, the product design is affected therewith and small, delicate products cannot be obtained. Secondly, when the first pivot shaft 30 (or the second pivot shaft 40) is pivoted, the second pivot shaft 40 (or the first pivot shaft 30) may be simultaneously tilted to push against the movable wheel 73 together with the first pivot shaft 30, thus to keep the movable wheel 73 to simultaneously contact the first and second pivot shafts 30 and 40. Thus, torque value of the pivoting first pivot shaft 30 (or the second pivot shaft 40) will be directly affected by the frictional force generated from the contact of the movable wheel 73 and the second pivot shaft 40 (or the first pivot shaft 30), and pivotal smoothness of the first and second pivot shafts 30 and 40 is changed accordingly.

BRIEF SUMMARY OF THE INVENTION

In view of the above-mentioned difficulties of the conventional double rotary shaft hinge device, the main purpose of the invention is to provide a shift-brake device of a twin-shaft hinge, capable of effectively shortening the distance between two pivot shafts by overlapping assemblies of controlling rotation sequence and facilitating the processes on designing small, delicate products.

Another purpose of the shift-brake device of the twin-shaft hinge of the invention is to provide mutual perpendicular design of between the locking operation direction of a pressing plate and the pivotal direction of a rotary shaft, thereby attaining a preferred locking effect.

To attain the purposes and effects above, the technical means of the shift-brake device of the twin-shaft hinge of the invention includes a locking assembly, a first pivot shaft and a second pivot shaft parallel to the first pivot shaft. The locking assembly includes a base seat, a pressing plate and two shaft sleeves, in which the base seat is configured with two through holes, the pressing plate having a middle section pivotally connected to a middle section of the base seat is configured with two sleeve holes corresponding to the two through holes of the base seat respectively, parts of external circumferences of the two sleeve holes of the pressing plate are respectively configured with convex portions, ends of the two shaft sleeves are respectively configured with sleeve portions capable of entering the two sleeve holes of the pressing plate, the two shaft sleeves are respectively circumferentially configured with circular flanges having concave portions corresponding to the convex portions of the pressing plate, and the two shaft sleeves are respectively configured with coupling holes in an extension direction of the two through holes of the base seat and the two sleeve holes of the pressing plate. The first and second pivot shafts have ends respectively, sequentially and penetratingly arranged in the two through holes of the base seat, the coupling holes of the two shaft sleeves and the two sleeve holes of the pressing plate to respectively connect the first and second pivot shafts to the base seat, the pressing plate and the two shaft sleeves of the locking assembly and to cause the first and second pivot shafts to respectively, synchronically pivot and link with the two shaft sleeves of the locking assembly, so that when one of the first and second pivot shafts is pivoted, the connected shaft sleeve of the locking assembly is synchronically driven to cause a concave portion thereof to be separated from a corresponding convex portion of the pressing plate, and the circular flange of the shaft sleeve is utilized to push against the convex portion of the pressing plate to incline the pressing plate and to cause the convex portion of the pressing plate to embed into the concave portions of the other shaft sleeve, thus to limitedly cause the other shaft sleeve unable to be pivoted.

According the above-mentioned structure, stop portions are respectively protrudingly configured on parts of external lateral sides of the two through holes of the base seat, and to-be-stopped portions are respectively protrudingly configured on parts of external lateral sides of ends of the two shaft sleeves apart from the sleeve portions of the two shaft sleeves, so that pivotal angles of the first and second pivot shafts can be limited by using the stop portions of the base seat to block the to-be-stopped portions of the two shaft sleeves.

According the above-mentioned structure, support portions are configured at two lateral sides located aside a region of between the two through holes of the base seat, and mounted portions corresponding to the support portions of the base seat are configured between two corresponding lateral sides located aside a middle section of a surface side of the pressing plate, so that the pressing plate is capable of pivotally swinging by taking the engagement of the support portions of the base seat and the mounted portions of the pressing plate as fulcrums.

According the above-mentioned structure, the support portions of the base seat are configured with holding concave portions, and the mounted portions of the pressing plate are configured with convex propping portions capable of entering the holding concave portions of the support portions of the base seat, in which the holding concave portions and the convex propping portions are located between the support portions of the base seat and the mounted portions of the pressing plate. The two sleeve holes of the pressing plate are elongated holes.

According the above-mentioned structure, end portions of the first and second pivot shafts, which are utilized to penetrate through the coupling holes of the two shaft sleeves, have lateral sides which are respectively configured with flat-cut positioning planes, and shapes and sizes of the coupling holes of the two shaft sleeves are equal to those of cross sections of the positioning planes of the first and second pivot shafts.

According the above-mentioned structure, the shift-brake device of the twin-shaft hinge further comprises a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

According the above-mentioned structure, end portions of the first and second pivot shafts, which are passed through the packing assembly, are respectively configured with fixing portions which are capable of coupling with fixing members, so that the first and second pivot shafts can be prevented from being released from the packing assembly respectively.

According the above-mentioned structure, a spacer positioning sheet which is configured on at least one lateral side of the locking assembly comprises through holes for being respectively penetrated though by the first and second pivot shafts, so that a constant spacing distance can be kept between the first and second pivot shafts.

According the above-mentioned structure, the shift-brake device of the twin-shaft hinge further comprises an external sleeve tube providing a predetermined containing space, and the locking assembly and the packing assembly are disposed in the predetermined containing space of the external sleeve tube.

According the above-mentioned structure, a to-be-positioned portion is configured on a middle section inside the containing space of the external sleeve tube, and a positioning portion capable of coupling with the to-be-positioned portion of the external sleeve tube is correspondingly configured on the packing assembly.

According the above-mentioned structure, the positioning portion of the packing assembly is connected to the to-be-positioned portion of the external sleeve tube by the positioning element.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 5 is a pivotal motion view of the conventional double rotary shaft hinge device with sequence rotational control;

FIG. 6 is a pivotal motion view of the conventional double rotary shaft hinge device with sequence rotational control;

FIG. 7 is a pivotal motion view of the conventional double rotary shaft hinge device with sequence rotational control;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
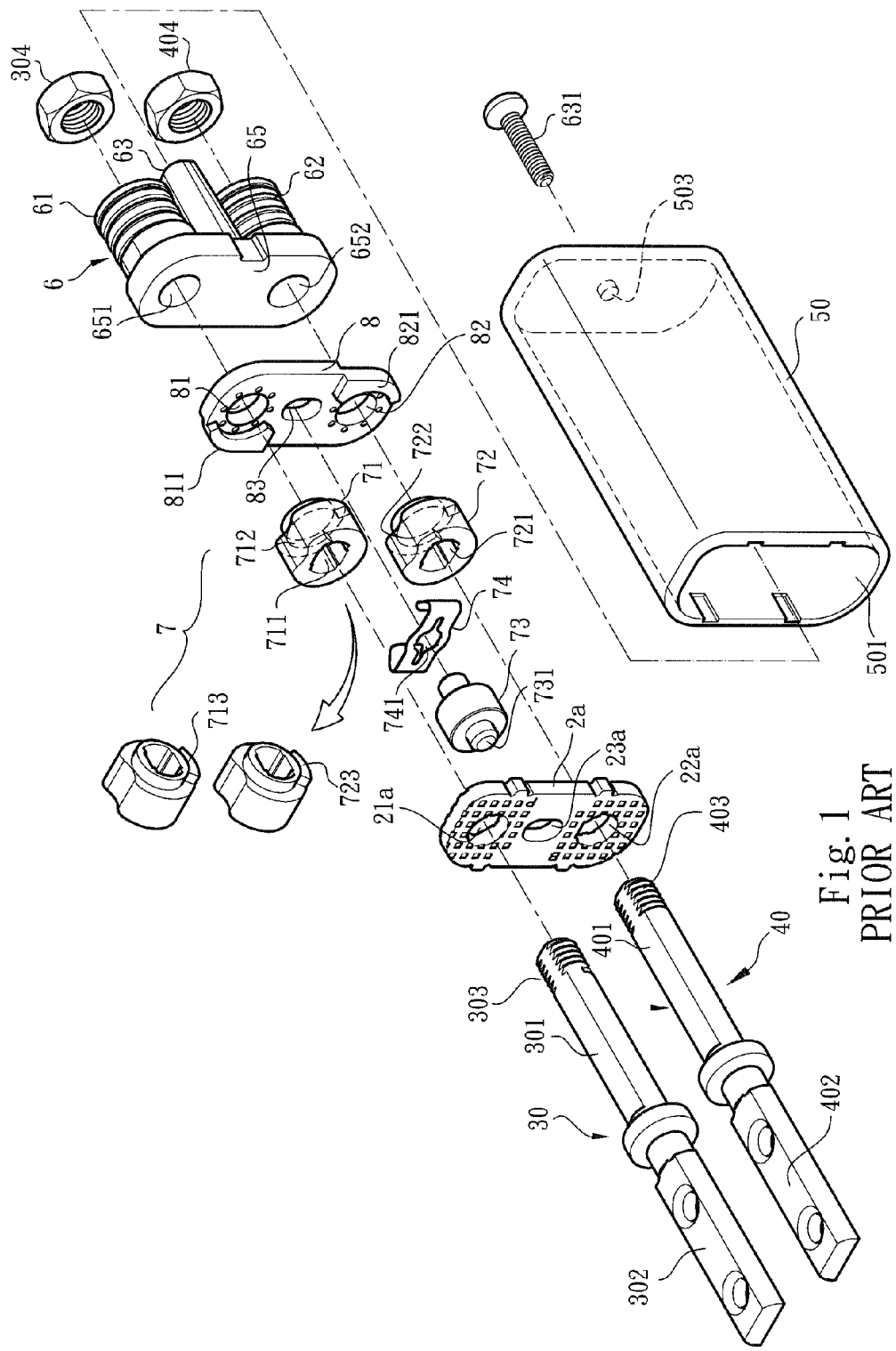
FIG. 1 is a structural exploded view of a conventional double rotary shaft hinge device with sequence rotational control.
Figure 2:
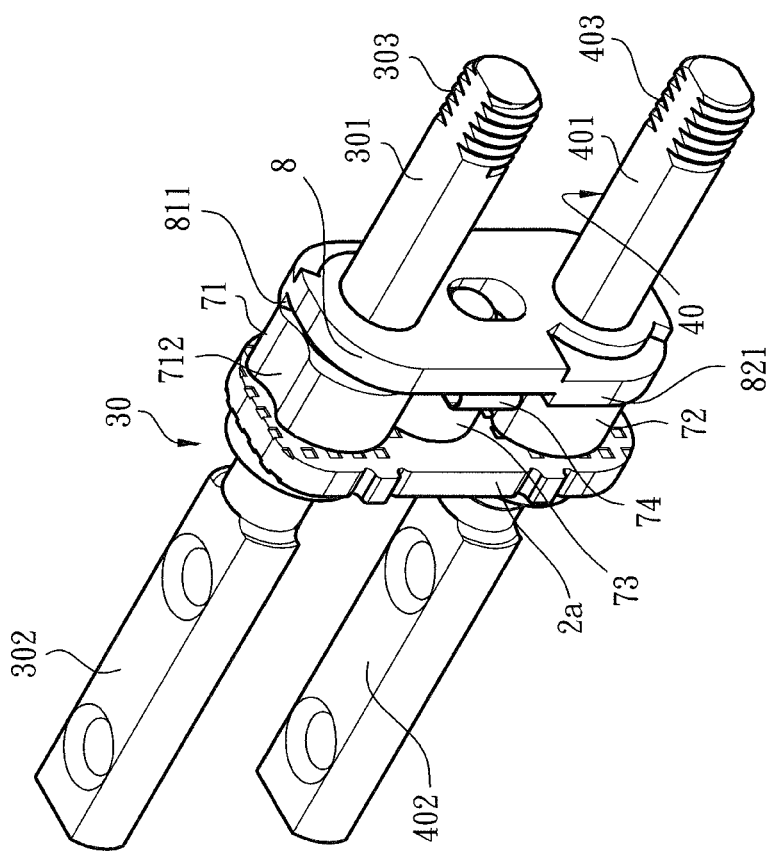
FIG. 2 is an assembled schematic view of the conventional double rotary shaft hinge device with sequence rotational control.
Figure 3:
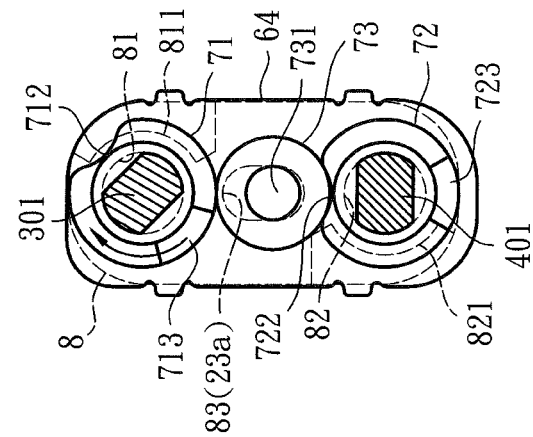
FIG. 3 is a pivotal motion view of the conventional double rotary shaft hinge device with sequence rotational control.
Figure 4:
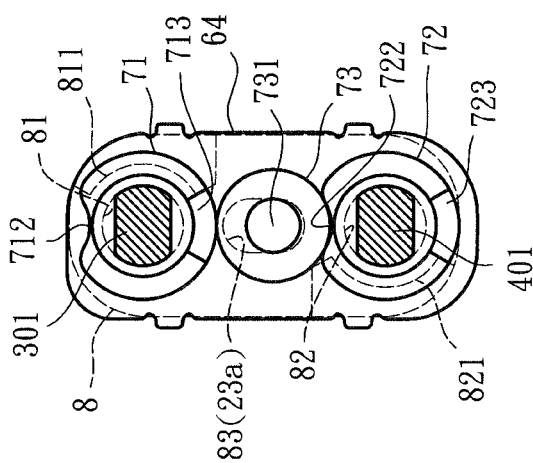
FIG. 4 is a pivotal motion view of the conventional double rotary shaft hinge device with sequence rotational control.
Figure 8:
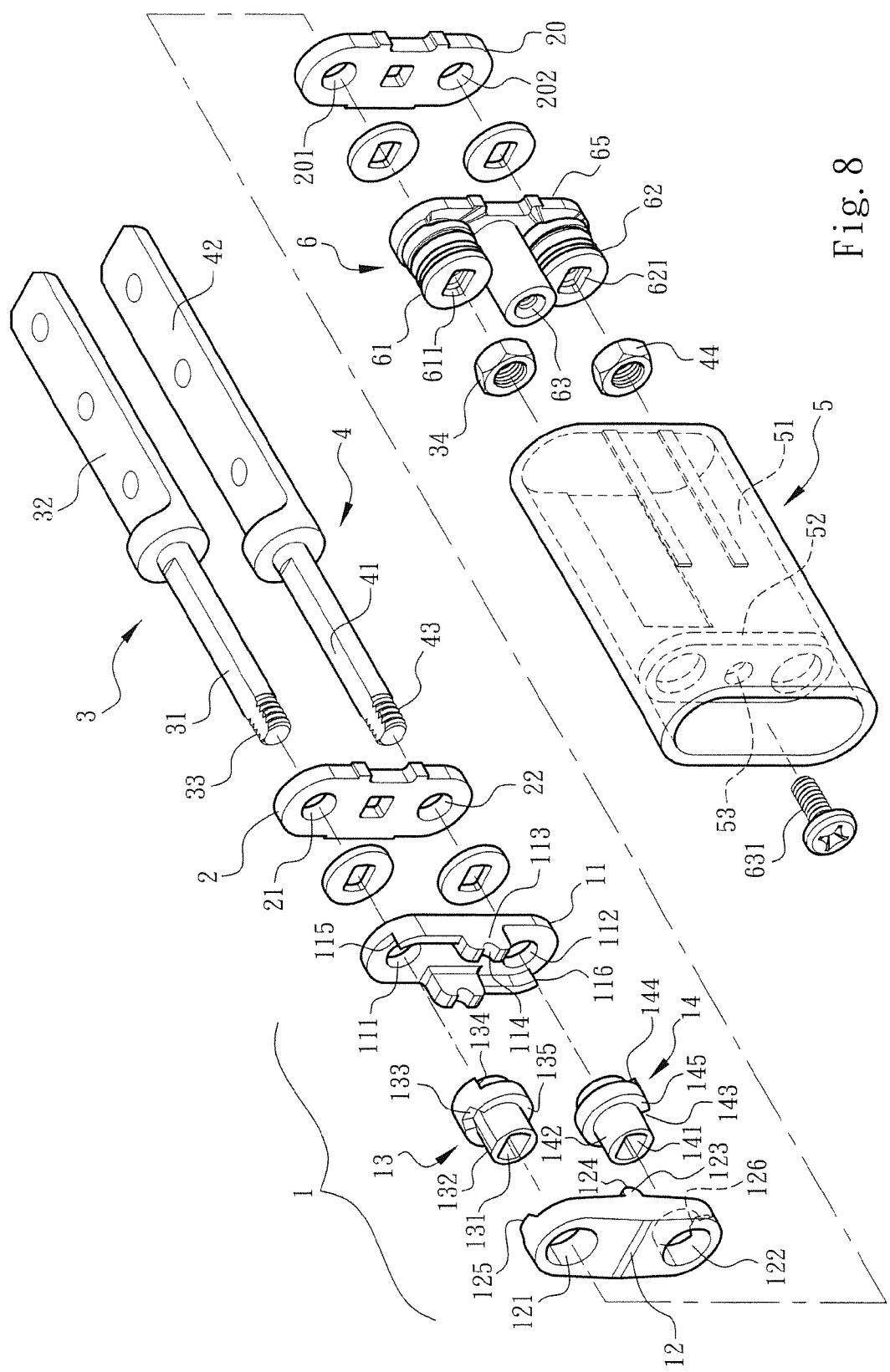
FIG. 8 is a structural exploded view of the invention.
Figure 9:
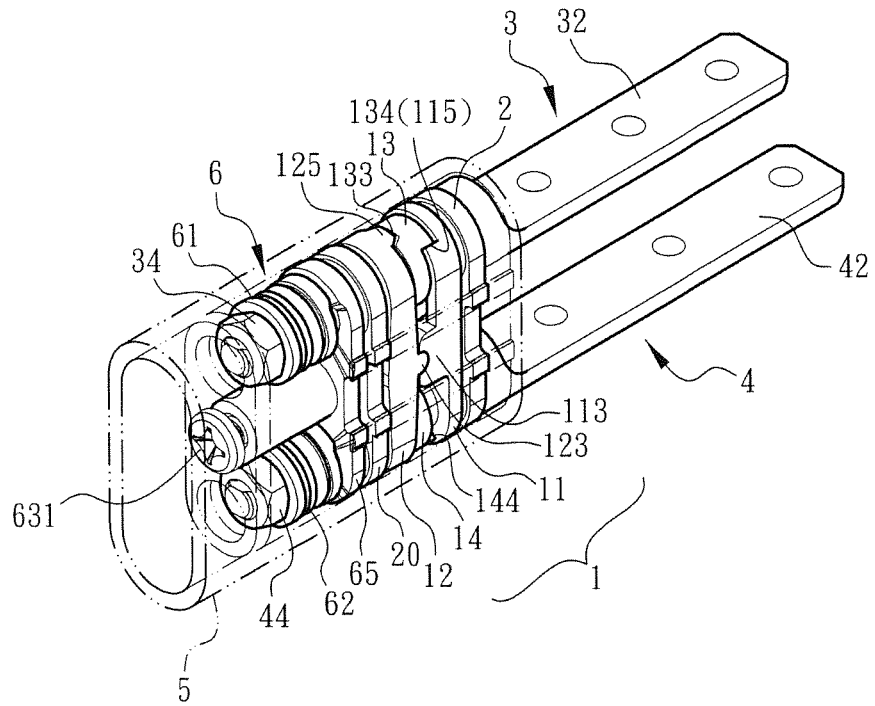
FIG. 9 is an assembled schematic view of the invention.
Figure 10:
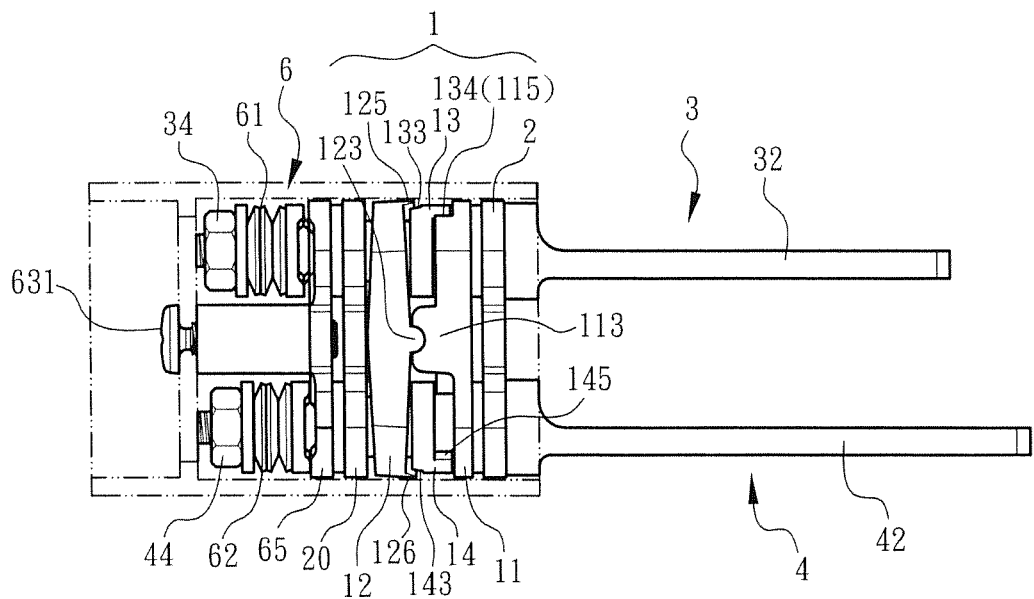
FIG. 10 is an assembled cross-sectional view of FIG. 8.

Referring to FIGS. 8, 9 and 10, a shift-brake device of a twin-shaft hinge of the invention mainly comprises a locking assembly 1, a first pivot shaft 3, and a second pivot shaft 4 parallel to the first pivot shaft 3. In this embodiment, the first and second pivot shafts 3 and 4 are the same. The locking assembly 1 comprises a base seat 11, a pressing plate 12 and two shaft sleeves 13 and 14. The base seat 11 comprises two through holes 111 and 112, two corresponding support portions 113, two holding concave portions 114 and two stop portions 115 and 116. As to the base seat 11, two through holes 111 and 112 are respectively configured on end portions thereof, the support portions 113 are respectively configured on lateral sides that are respectively located aside a region of between the through holes 111 and 112, the holding concave portions 114 are respectively configured on the support portions 113, and the stop portions 115 and 116 are respectively protrudingly configured on parts of external lateral sides (or external circumferences) of the through holes 111 and 112. The pressing plate 12 having a middle section pivotally connected to a middle section of the base seat 11 comprises two sleeve holes 121 and 122, two mounted portions 123, two convex propping portions 124 and two convex portions 125 and 126. As to the pressing plate 12, the sleeve holes 121 and 122 are respectively configured on two ends thereof and corresponding to the through holes 111 and 112 of the base seat 11, the mounted portions 123 corresponding to the support portions 113 of the base seat 11 are configured between two corresponding lateral sides located aside a middle section of a surface side thereof, the convex propping portions 124 are respectively configured on lateral sides that are located aside a middle section of a surface side thereof and capable of entering the holding concave portions 114 of the support portions 113 of the base seat 11 so that the pressing plate 12 is capable of pivotally swinging by taking the engagement of the support portions 113 of the base seat 11 and the mounted portions 123 as fulcrums, and the convex portions 125 and 126 near sides thereof are respectively transversely configured on parts of external circumferences of the sleeve holes 121 and 122 (i.e., the convex portions 125 and 126 are respectively transversely configured along parts of periphery positions of the sleeve holes 121 and 122). As to the base seat 11 and the pressing plate 12, the holding concave portions 114 and the convex propping portions 124 are located between the support portions 113 of the base seat 11 and the mounted portions 123 of the pressing plate 12. In this embodiment, the sleeve holes 121 and 122 of the pressing plate 12 can be elongated holes. The shaft sleeves 13 and 14 comprise circular flanges 135 and 145 which are respectively circumferentially configured on middle sections thereof and having concave portions 133 and 143 corresponding to the convex portions 125 and 126 of the pressing plate 12, sleeve portions 132 and 142 which are respectively located at lateral sides of the circular flanges 135 and 145, configured on ends thereof and capable of entering the sleeve holes 121 and 122 of the pressing plate 12, coupling holes 131 and 141 which are respectively configured on centers of the sleeve portions 132 and 142 in an extension direction of the through holes 111 and 112 of the base seat 11 and the sleeve holes 121 and 122 of the pressing plate 12, and to-be-stopped portions 134 and 144 which are respectively protrudingly configured on parts of external lateral sides of ends thereof apart from the sleeve portions 132 and 142 (i.e., on parts of external circumferences of the coupling holes 131 and 141 where is located on sides thereof to be close to the base seat 11).

The first and second pivot shafts 3 and 4 comprise flat-cut positioning planes 31 and 41, connecting portions 32 and 42 and fixing portions 33 and 43. As to the first and second pivot shafts 3 and 4, the fixing portions 33 and 43 and the connecting portions 32 and 42 are respectively configured on end portions thereof, and the flat-cut positioning planes 31 and 41 are respectively configured on lateral sides of end portions thereof from middle sections toward the fixing portions 33 and 43, i.e., the positioning planes 31 and 41 are respectively configured on the lateral sides of the end portions thereof. In this embodiment, the fixing portions 33 and 43 of the first and second pivot shafts 3 and 4 can be external screw threads, and shapes and sizes of the coupling holes 131 and 141 of the shaft sleeves 13 and 14 are equal to those of cross sections of the positioning planes of the first and second pivot shafts 3 and 4. With the ends of the first and second pivot shafts 3 and 4 including the positioning planes 31 and 41 to be respectively and sequentially penetrated through and arranged in the through holes 111 and 112 of the base seat 11, the coupling holes 131 and 141 of the shaft sleeves 13 and 14 and the sleeve holes 121 and 122 of the pressing plate 12, the first and second pivot shafts 3 and 4 can be respectively connected to the base seat 11, the pressing plate 12 and the shaft sleeves 13 and 14 of the locking assembly 1.

In practice, the locking assembly 1 and the first and second pivot shafts 3 and 4 can be implemented by cooperating with a packing assembly 6 and two separate spacer positioning sheets 2 and 20. The packing assembly 6, which is configured on one side of the locking assembly 1 apart from the first and second pivot shafts 3 and 4, comprises elastic portions 61 and 62, a positioning portion 63 and a base body 65. As to the packing assembly 6, the base body 65 comprises corresponding through holes utilized for being respectively penetrated though by the first and second pivot shafts 3 and 4 and connecting the elastic portions 61 and 62, the elastic portions 61 and 62 comprise two sleeve holes 611 and 621 which are respectively utilized to fixedly sleeve on the ends of the first and second pivot shafts 3 and 4 including the positioning planes 31 and 41, and the positioning portion 63 configured on the base body 65 is located between the elastic portions 61 and 62. In this embodiment, the positioning portion 63 can be a threaded hole. Two fixing members 34 and 44 (e.g., screw nuts) are utilized to respectively couple with the fixing portions 33 and 43 (the external screw threads) of the first and second pivot shafts 3 and 4, so that a packing condition with elasticity can be kept between the first and second pivot shafts 3 and 4 and the base body 65 of the packing assembly 6. The spacer positioning sheets 2 and 20 are respectively configured on both lateral sides of the locking assembly 1, comprising through holes 21/201 and 22/202 for being respectively penetrated though by the positioning planes 31 and 41 of the first and second pivot shafts 3 and 4, so that a constant spacing distance can be kept between the first and second pivot shafts 3 and 4.

In an executable embodiment, the locking assembly 1 and the packing assembly 6 are disposed in a predetermined containing space 51 of an external sleeve tube 5. The external sleeve tube 5 comprises the containing space 51, a partition portion 52 which is transversely configured on a middle section of the containing space 51, and a to-be-positioned portion 53 which is corresponding to the positioning portion 63 (i.e., a threaded hole) of the packing assembly 6 and configured on the partition portion 52 (also configured on the middle section inside the containing space 51). A positioning element 631 is utilized to pass through the to-be-positioned portion 53 of the external sleeve tube 5 to screw into the positioning portion 63 of the packing assembly 6, so that the locking assembly 1 and the packing assembly 6 can be fixed in the external sleeve tube 5. In this embodiment, the to-be-positioned portion 53 can be a through hole, and the positioning element 631 can be a bolt. That is, the positioning portion 63 of the packing assembly 6 is connected to the to-be-positioned portion 53 of the external sleeve tube 5 by the positioning element 631.

Figure 11:
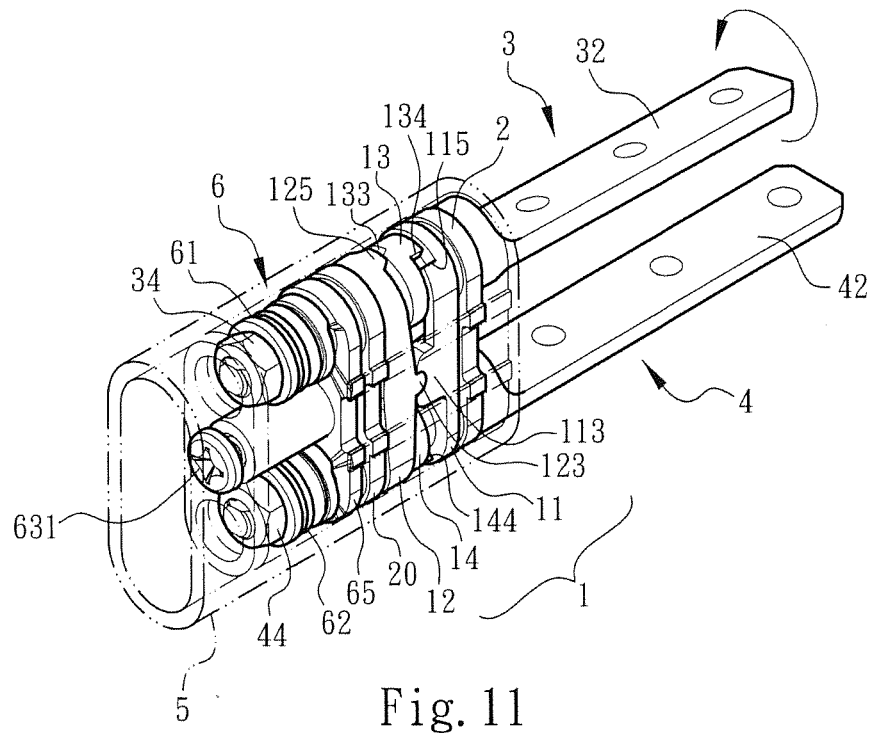
FIG. 11 is a schematic view of the invention, illustrating a condition that one pivot shaft is operated and the other is locked.
Figure 12:
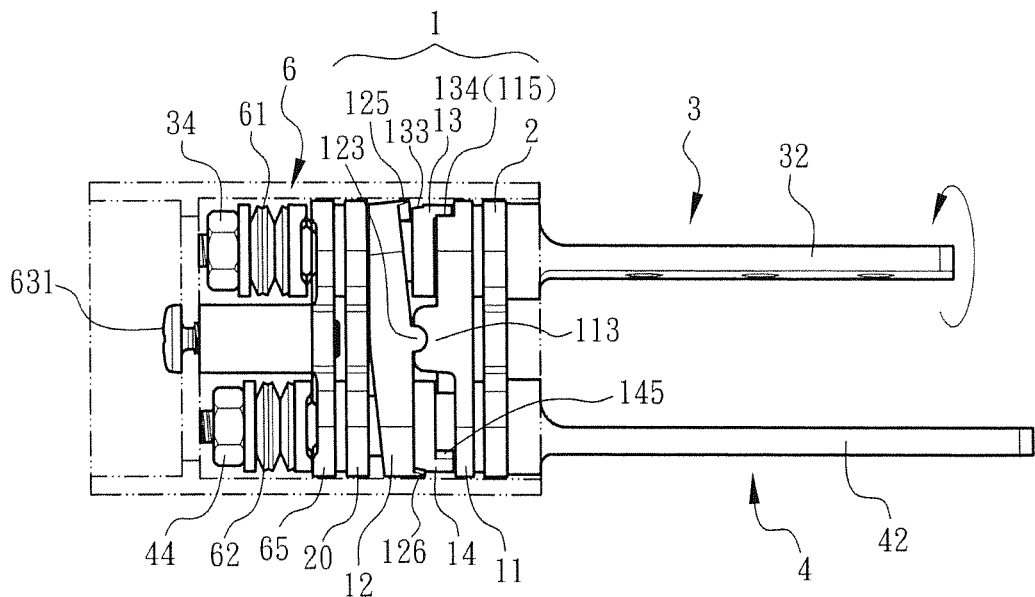
FIG. 12 is an assembled cross-sectional view of FIG. 11.

Referring to FIGS. 11 and 12, in practical use of the invention, the connecting portions 32 and 42 of the first and second pivot shafts 3 and 4 can be respectively coupled with a pivotal member (e.g., a liquid crystal monitor, but not shown in FIGS.) and a relative pivotal member (e.g., a host body, but not shown in FIGS.) depending on requirements. When the pivotal member (the liquid crystal monitor) and the relative pivotal member (the host body) are situated in a relatively covered storage condition, the first and second pivot shafts 3 and 4 inside the locking assembly 1 are utilized to keep the convex portions 125 and 126 of the pressing plate 12 to simultaneously partially embed into the concave portions 133 and 143 of the shaft sleeves 13 and 14 (as shown in FIG. 10), and therefore the pressing plate 12 can be reciprocally pivoted at a small angle relative to the base seat 11 of the locking assembly 1.

When the pivotal member (the first pivot shaft 3) is pivoted, the positioning plane 31 of the first pivot shaft 3 drives the shaft sleeve 13 of the locking assembly 1 to be synchronically pivoted, enabling the concave portion 133 of the shaft sleeve 13 of the locking assembly 1 to disengage from the convex portion 125 of the pressing plate 12; meanwhile, the circular flange 135 of the shaft sleeve 13 is utilized to push against the convex portion 125 of the pressing plate 12 to incline the pressing plate 12, and the convex portion 126 of the pressing plate 12 is closely embedded into the concave portions 143 of the shaft sleeve 14 (as shown in FIGS. 11 and 12). Thus, the second pivot shaft 4 coupled with the shaft sleeve 14 of the locking assembly 1 is situated in a locked condition which is incapable of being rotated, and the stop portion 115 of the base seat 11 is utilized to block the to-be-stopped portion 134 of the shaft sleeve 13, thereby limiting pivotal angle of the pivotal member (the first pivot shaft 3). Similarly, when the pivotal member (second pivot shaft 4) is pivoted, the positioning plane 41 of the second pivot shaft 4 drives the shaft sleeve 14 of the locking assembly 1 to be synchronically pivoted, enabling the concave portion 143 of the shaft sleeve 14 of the locking assembly 1 to disengage from the convex portion 126 of the pressing plate 12; meanwhile, the circular flange 145 of the shaft sleeve 14 is utilized to push against the convex portion 126 of the pressing plate 12 to reversely incline the pressing plate 12, and the convex portion 125 of the pressing plate 12 is closely embedded into the concave portions 133 of the shaft sleeve 13.

Thus, the first pivot shaft 3 coupled with the shaft sleeve 13 of the locking assembly 1 is situated in a locked condition which is incapable of being rotated, and the stop portion 116 of the base seat 11 is utilized to block the to-be-stopped portion 144 of the shaft sleeve 14, thereby limiting pivotal angle of the relative pivotal member (the second pivot shaft 4). Accordingly, efficacies of sequence rotational control on operating the first and second pivot shafts 3 and 4 can be achieved.

In conclusion, with the shift-brake device of the twin-shaft hinge of the invention providing structure design of the base seat 11 and the pressing plate 12 in cooperation with the shaft sleeves 13 and 14, it is obvious that the distance of shaft lines of the locking assembly 1 assembled on the first and second pivot shafts 3 and 4 can be possibly reduced, and therefore efficacies of small volume, simple operation and better control of lock-in effect in sequence rotation can be achieved. While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A shift-brake device of a twin-shaft hinge, at least comprising:

a locking assembly comprising a base seat, a pressing plate and two shaft sleeves, in which the base seat is configured with two through holes, the pressing plate having a middle section pivotally connected to a middle section of the base seat is configured with two sleeve holes corresponding to the two through holes of the base seat respectively, ends of the two shaft sleeves are respectively configured with sleeve portions capable of entering the two sleeve holes of the pressing plate, the two shaft sleeves are respectively circumferentially configured with circular flanges having concave portions, parts of external circumferences of the two sleeve holes of the pressing plate are respectively configured with convex portions that are correspondingly fitted to the concave portions of the two shaft sleeves, and the two shaft sleeves are respectively configured with coupling holes in an extension direction of the two through holes of the base seat and the two sleeve holes of the pressing plate; and a first pivot shaft and a second pivot shaft parallel to the first pivot shaft, in which the first and second pivot shafts have ends respectively, sequentially and penetratingly arranged in the two through holes of the base seat, the coupling holes of the two shaft sleeves and the two sleeve holes of the pressing plate so that the first and second pivot shafts are respectively connected to the base seat, the pressing plate and the two shaft sleeves of the locking assembly and the first and second pivot shafts are respectively, synchronically pivoted and linked with the two shaft sleeves of the locking assembly, wherein the first pivot shaft is connected to a first shaft sleeve of said two shaft sleeves and the second pivot shaft is connected to a second shaft sleeve of said two shaft sleeves, so that when the first pivot shaft is pivoted, the connected first shaft sleeve of the locking assembly is synchronically driven when the first pivot shaft is pivoted and the circular flange of the first and second shaft sleeve is utilized to push against the convex portion of the pressing plate to incline the pressing plate toward the second shaft sleeve so that the convex portion of the pressing plate which is located between the second shaft sleeve and the pressing plate is correspondingly embedded into the concave portion of the shaft sleeves to limit pivoting of the second shaft sleeve.

2. The shift-brake device of the twin-shaft hinge as claimed in claim 1, wherein stop portions are respectively protrudingly configured on parts of external lateral sides of the two through holes of the base seat, and to-be-stopped portions are respectively protrudingly configured on parts of external lateral sides of ends of the two shaft sleeves apart from the sleeve portions of the two shaft sleeves, so that pivotal angles of the first and second pivot shafts can be limited by using the stop portions of the base seat to block the to-be-stopped portions of the two shaft sleeves.

3. The shift-brake device of the twin-shaft hinge as claimed in claim 2, wherein support portions are configured at two lateral sides located aside a region of between the two through holes of the base seat, and mounted portions corresponding to the support portions of the base seat are configured between two corresponding lateral sides located aside a middle section of a surface side of the pressing plate, so that the pressing plate is capable of pivotally swinging by taking the engagement of the support portions of the base seat and the mounted portions of the pressing plate as fulcrums.

4. The shift-brake device of the twin-shaft hinge as claimed in claim 3, wherein the support portions of the base seat are configured with holding concave portions, and the mounted portions of the pressing plate are configured with convex propping portions capable of entering the holding concave portions of the support portions of the base seat, in which the holding concave portions and the convex propping portions are located between the support portions of the base seat and the mounted portions of the pressing plate.

5. The shift-brake device of the twin-shaft hinge as claimed in claim 4 further comprising a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

6. The shift-brake device of the twin-shaft hinge as claimed in claim 3 further comprising a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

7. The shift-brake device of the twin-shaft hinge as claimed in claim 3, wherein a spacer positioning sheet which is configured on at least one lateral side of the locking assembly comprises through holes for being respectively penetrated though by the first and second pivot shafts, so that a constant spacing distance can be kept between the first and second pivot shafts.

8. The shift-brake device of the twin-shaft hinge as claimed in claim 2 further comprising a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

9. The shift-brake device of the twin-shaft hinge as claimed in claim 2, wherein a spacer positioning sheet which is configured on at least one lateral side of the locking assembly comprises through holes for being respectively penetrated though by the first and second pivot shafts, so that a constant spacing distance can be kept between the first and second pivot shafts.

10. The shift-brake device of the twin-shaft hinge as claimed in claim 1, wherein support portions are configured at two lateral sides located aside a region of between the two through holes of the base seat, and mounted portions corresponding to the support portions of the base seat are configured between two corresponding lateral sides located aside a middle section of a surface side of the pressing plate, so that the pressing plate is capable of pivotally swinging by taking the engagement of the support portions of the base seat and the mounted portions of the pressing plate as fulcrums.

11. The shift-brake device of the twin-shaft hinge as claimed in claim 10, wherein the support portions of the base seat are configured with holding concave portions, and the mounted portions of the pressing plate are configured with convex propping portions capable of entering the holding concave portions of the support portions of the base seat, in which the holding concave portions and the convex propping portions are located between the support portions of the base seat and the mounted portions of the pressing plate.

12. The shift-brake device of the twin-shaft hinge as claimed in claim 11 further comprising a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

13. The shift-brake device of the twin-shaft hinge as claimed in claim 12, wherein end portions of the first and second pivot shafts, which are passed through the packing assembly, are respectively configured with fixing portions which are capable of coupling with fixing members, so that the first and second pivot shafts can be prevented from being released from the packing assembly respectively.

14. The shift-brake device of the twin-shaft hinge as claimed in claim 11, wherein a spacer positioning sheet which is configured on at least one lateral side of the locking assembly comprises through holes for being respectively penetrated though by the first and second pivot shafts, so that a constant spacing distance can be kept between the first and second pivot shafts.

15. The shift-brake device of the twin-shaft hinge as claimed in claim 14 further comprising an external sleeve tube providing a predetermined containing space, and the locking assembly and the packing assembly are disposed in the predetermined containing space of the external sleeve tube.

16. The shift-brake device of the twin-shaft hinge as claimed in claim 10, wherein end portions of the first and second pivot shafts, which are utilized to penetrate through the coupling holes of the two shaft sleeves, have lateral sides which are respectively configured with flat-cut positioning planes, and shapes and sizes of the coupling holes of the two shaft sleeves are equal to those of cross sections of the positioning planes of the first and second pivot shafts.

17. The shift-brake device of the twin-shaft hinge as claimed in claim 10 further comprising a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

18. The shift-brake device of the twin-shaft hinge as claimed in claim 17, wherein end portions of the first and second pivot shafts, which are passed through the packing assembly, are respectively configured with fixing portions which are capable of coupling with fixing members, so that the first and second pivot shafts can be prevented from being released from the packing assembly respectively.

19. The shift-brake device of the twin-shaft hinge as claimed in claim 10, wherein a spacer positioning sheet which is configured on at least one lateral side of the locking assembly comprises through holes for being respectively penetrated though by the first and second pivot shafts, so that a constant spacing distance can be kept between the first and second pivot shafts.

20. The shift-brake device of the twin-shaft hinge as claimed in claim 19 further comprising an external sleeve tube providing a predetermined containing space, and the locking assembly and the packing assembly are disposed in the predetermined containing space of the external sleeve tube.

21. The shift-brake device of the twin-shaft hinge as claimed in claim 20, wherein a to-be-positioned portion is configured on a middle section inside the containing space of the external sleeve tube, and a positioning portion capable of coupling with the to-be-positioned portion of the external sleeve tube is correspondingly configured on the packing assembly.

22. The shift-brake device of the twin-shaft hinge as claimed in claim 21, wherein the positioning portion of the packing assembly is connected to the to-be-positioned portion of the external sleeve tube by a positioning element.

23. The shift-brake device of the twin-shaft hinge as claimed in claim 1, wherein end portions of the first and second pivot shafts, which are utilized to penetrate through the coupling holes of the two shaft sleeves, have lateral sides which are respectively configured with flat-cut positioning planes, and shapes and sizes of the coupling holes of the two shaft sleeves are equal to those of cross sections of the positioning planes of the first and second pivot shafts.

24. The shift-brake device of the twin-shaft hinge as claimed in claim 1 further comprising a packing assembly configured on one side of the locking assembly apart from the first and second pivot shafts, and the packing assembly comprises a base body which provides through holes for being respectively penetrated though by the first and second pivot shafts and elastic portions which are respectively connected to the through holes of the base body and fixedly sleeved on the first and second pivot shafts, so that a packing condition with elasticity can be kept between the first and second pivot shafts and the base body of the packing assembly.

25. The shift-brake device of the twin-shaft hinge as claimed in claim 24, wherein end portions of the first and second pivot shafts, which are passed through the packing assembly, are respectively configured with fixing portions which are capable of coupling with fixing members, so that the first and second pivot shafts can be prevented from being released from the packing assembly respectively.

26. The shift-brake device of the twin-shaft hinge as claimed in claim 1, wherein a spacer positioning sheet which is configured on at least one lateral side of the locking assembly comprises through holes for being respectively penetrated though by the first and second pivot shafts, so that a constant spacing distance can be kept between the first and second pivot shafts.

27. The shift-brake device of the twin-shaft hinge as claimed in claim 26 further comprising an external sleeve tube providing a predetermined containing space, and the locking assembly and the packing assembly are disposed in the predetermined containing space of the external sleeve tube.

28. The shift-brake device of the twin-shaft hinge as claimed in claim 27, wherein a to-be-positioned portion is configured on a middle section inside the containing space of the external sleeve tube, and a positioning portion capable of coupling with the to-be-positioned portion of the external sleeve tube is correspondingly configured on the packing assembly.

29. The shift-brake device of the twin-shaft hinge as claimed in claim 28, wherein the positioning portion of the packing assembly is connected to the to-be-positioned portion of the external sleeve tube by a positioning element.

\* \* \* \* \*